United States Patent [19]

Coffman

[11] E Re. 30,355

[45] Reissued Jul. 29, 1980

[54] TRAFFIC FLOW CONTROL SYSTEM

[76] Inventor: Moody L. Coffman, 1832 NW. 17th St., Oklahoma City, Okla. 73106

[21] Appl. No.: 294,882

[22] Filed: Oct. 4, 1972

Related U.S. Patent Documents

Reissue of:

[64] Patent No.: 3,533,062
Issued: Oct. 6, 1970
Appl. No.: 606,828
Filed: Jan. 3, 1967

[51] Int. Cl.[2] ..... G08G 1/07; G08G 1/095

[52] U.S. Cl. ..... 340/40; 340/43; 340/104; 404/20

[58] Field of Search ..... 340/43, 35, 40, 104; 404/20

[56] References Cited

U.S. PATENT DOCUMENTS

| | | | |
|---|---|---|---|
| 2,114,968 | 4/1938 | Nein | 340/35 |
| 2,133,157 | 10/1938 | Turner | 340/43 |
| 2,683,868 | 7/1954 | McKnight | 340/43 |
| 3,208,039 | 9/1965 | Hilliker | 340/35 |

*Primary Examiner*—John W. Caldwell, Sr.
*Assistant Examiner*—James J. Groody
*Attorney, Agent, or Firm*—William R. Laney

[57] ABSTRACT

A traffic intersection and flow control system which includes a hexagonally shaped, multilane roadway having radiating, multilane roadways extending outwardly from each corner of the hexagonal roadway. Traffic dividing island means are provided in the hexagonal roadway between each corner of the hexagon and are also provided in the several radiating multilane roadways. The islands and traffic lanes are arranged so that all traffic in the innermost lane (relative to the space enclosed by the hexagon) moves at all times in the same direction which is opposite the direction of movement at all times of traffic in the outermost lane. The islands and lanes are also positioned so that traffic moving in any lane will at no time cross in front of traffic moving in any other lane. Traffic control signals are provided adjacent each corner of the hexagonal multilane roadway for controlling the flow of traffic in three directions through the intersection of the hexagonal roadway with the several radiating roadways.

The traffic control signals preferably used include at least two lamps for producing light of different colors, a louver system associated with each lamp, and cam means for moving each louver system synchronously to direct the light from each lamp in controlled, contiguous sectors.

19 Claims, 11 Drawing Figures

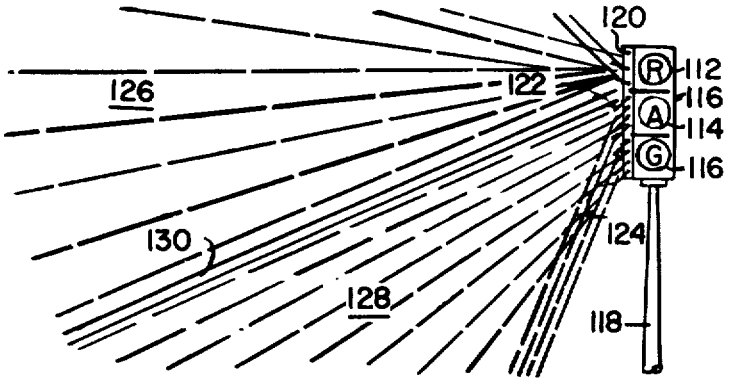
FIG. 5
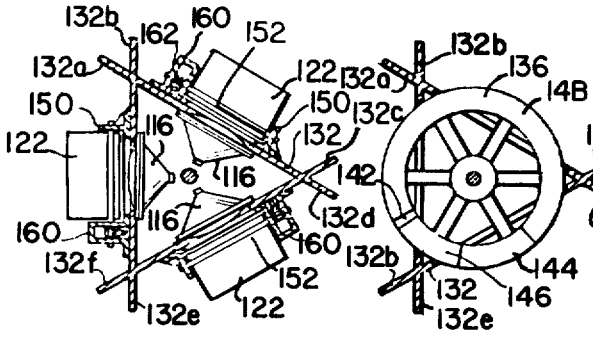
FIG. 9
FIG. 8
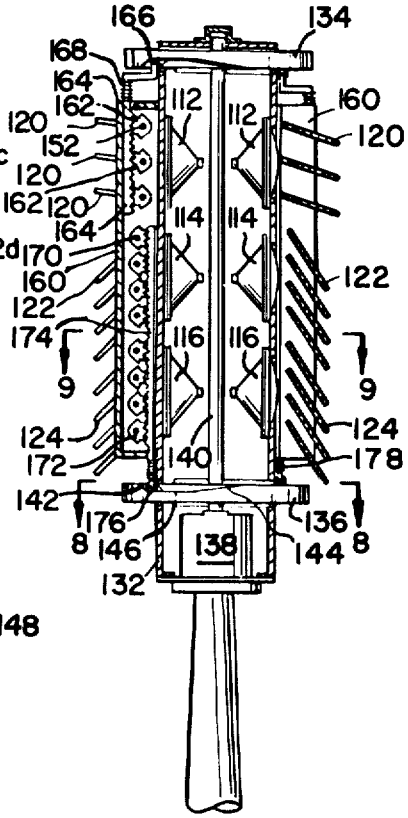
FIG. 7
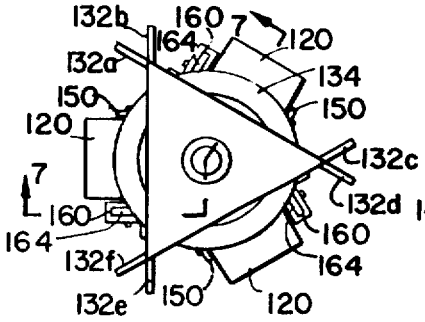
FIG. 6
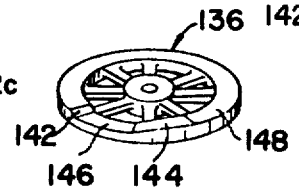
FIG. 10
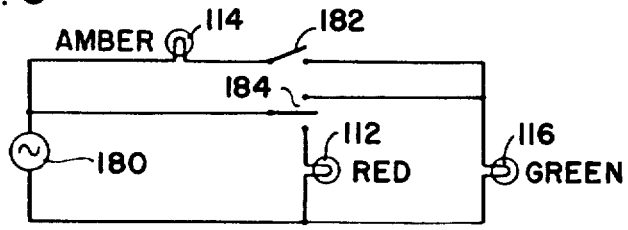
FIG. 11

TRAFFIC FLOW CONTROL SYSTEM

Matter enclosed in heavy brackets [ ] appears in the original patent but forms no part of this reissue specification; matter printed in italics indicates the additions made by reissue.

This invention relates to a traffic flow control system which provides for the movement of vehicular traffic through a densely populated area with minimum congestion and maximum safe speed. More specifically, the present invention relates to a method and system for more efficiently moving large numbers of automobiles through a downtown or industrial district while providing an optimum arrangement for the location of industrial or commercial buildings and adequate parking facilities for high volume vehicular traffic.

There is currently widespread concern in many urban areas about the problem of more efficiently accommodating the flow of great numbers of automobiles through downtown or industrial areas. Concurrently, it has been widely recognized that many municipalities have grown up in a hodgepodge fashion without making adequate provision for traffic flow in densely populated areas, and without providing adequate parking facilities for the accommodation of the large numbers of automobiles which preferably should be parked and located in relatively close proximity to businesses, industries and high density downtown residential areas where the drivers of the automobiles live and work.

A number of traffic intersection and traffic flow arrangements have heretofore been proposed in an effort to more efficiently move the heavy traffic through densely populated urban areas. Among the most recent proposals of this type are those which are set out in U.S. Pats. 2,941,454 and 2,949,067, both issued to A. O. Cedeno. The Cedeno traffic intersection proposals generally employ multilevel structures in which traffic lanes are made to cross at different levels so that no interference occurs between the traffic flow in several lanes. Elaborate provision is also made for pedestrian routes through the maze of traffic lanes provided in the Cedeno systems for permitting free movement of pedestrian traffic without impeding the flow of vehicular traffic through the multilane intersections. The Cedeno systems, while indeed able to accommodate high volumes of vehicular traffic, are somewhat complicated in their arrangement, and require a considerable amount of skill or prior knowledge on the part of drivers utilizing the systems to avoid entering the wrong lanes, and in order to utilize the system with maximum efficiency in moving from one place to another. Also, due to the multilevel character of the Cedeno systems, many of the traffic lanes provided are underground or at least are located below several other lanes positioned at higher levels with the requirement that artificial lighting must be provided to assure effective and safe visibility for the operators of vehicles using the systems.

The present invention proposes a relatively simple and economical, yet highly efficient traffic intersection and flow control system which can be employed for moving traffic through densely populated urban areas in a minimum time and with minimum congestion. The traffic system of the present invention is ideally adapted for inclusion in existing traffic grid patterns of conventional character so that, in situations where it is proposed to undertake the renewal of large urban areas while permitting other parts of the urban community to remain unchanged, the traffic flow system of the present invention can be very conveniently and effectively integrated with the unrenewed portion of the metropolitan area without the necessity to reroute or change existing traffic arteries in those portions of the municipality where no structural renewal is to be effected.

Broadly described, the traffic intersection and flow control system of the invention comprises a generally hexagonal, multilane roadway having radiating, multilane roadways extending outwardly from each corner of the hexagonal multilane roadway somewhat similarly to the plan depicted on page 154 of the publication. "The American City," November, 1929, issue. The hexagonal appearance of the intersecting multilane roadways is also generally similar when viewed in plan to that which is depicted in Cedeno U.S. Pat. 2,941,454. In the present invention, however, the lanes of each of the multilane roadways are located in a single level.

Traffic dividing island means are provided in the hexagonal multilane roadway between each corner of the hexagon, and also in each of the radiating multilane roadways. These traffic dividing islands are strategically placed for permitting traffic moving in a single lane to diverge for movement in a plurality of lanes. The islands and traffic lanes of the system are arranged or positioned so that all traffic in the innermost lane of the hexagonal roadway which is nearest the hexagonal space enclosed by this roadway moves at all times in the same direction, and all traffic in the outermost lane of the hexagonal roadway moves at all times in a direction opposite to the direction of movement of traffic in the innermost lane. The traffic dividing islands and lanes of the roadways are also positioned so that traffic moving in any of the lanes will at no time cross in front of traffic moving in any other lane. Finally, traffic control signals are provided adjacent each corner of the hexagonal multilane roadway for controlling the flow of traffic in three directions through the intersection of the hexagonal multilane roadway with the several radiating multilane roadways.

With the described traffic flow control system, traffic can be moved expeditiously across a densely populated urban area, since traffic congestion is minimized, and little opportunity is afforded for traffic moving in any lane to cross in front of, or obstruct, traffic moving in other lanes. The system is characterized in having great flexibility in that every radiating multilane roadway which extends from any of the corners of the hexagonal roadway is accessible from substantially any point within the hexagonal enclosure, and vehicle operators can, with a minimum of difficulty, maneuver their automobiles to move outwardly on any one of the radiating roadways, or to remain on the hexagonal roadway, depending upon their ultimate destination. The system is economical to construct since all lanes of the several roadways are provided in a single level, and since a minimum number of traffic control signals are required for governing the total flow of traffic in the system. Two-way traffic flow is provided over every portion of each of the roadways so that all locations on any of the roadways are accessible from any part of the system.

Although any number of lanes can be provided in the hexagonal roadway and in the radiating roadways, an odd number of lanes in each is preferred, and a very economical yet highly efficient preferred system contemplates the provision of three lanes in both the hexagonal roadway and in each of the radiating roadways.

Since the entire system can be located at ground level, no requirement exists for artificial lighting and easy access can be had to any of the lanes of any of the roadways from ground level access streets.

From the foregoing description of the invention, it will be apparent that the present invention provides an improved traffic flow control system which can be economically constructed, but which can be used to efficiently and expeditiously move heavy traffic through a densely populated area with maximum safety.

An additional object of the invention is to provide a traffic intersection and flow control system in which traffic is always either aligned or diverging, and is never converging so as to present risks of collisions between vehicles.

Another object of the invention is to provide a traffic intersection in which traffic enters and passes through the intersection from a single direction only at any given time.

An additional object of the invention is to provide a traffic intersection and flow control system in which threeway traffic control signals or lights are employed to permit traffic entering the intersections from three different directions at different times to turn to the right or to the left from the intersecting streets.

An additional object of the invention is to provide a traffic intersection and flow control system in which automobiles experience no need to turn through an angle of more than 60° at any time during the use of the system.

An additional object of the invention is to provide a traffic intersection and flow control system in which drivers preparing to proceed through the intersection are prevented from anticipating changes in the traffic control signals employed by positioning the traffic control signal apparatus so that signals to other drivers at the intersection are totally outside the field of view of the first-mentioned drivers.

Another object of the invention is to provide a traffic intersection and flow control system involving a hexagonal grid of roadways which can be easily adapted or accommodated to existing streets and traffic arteries in situations where it is desired to renew a large, centrally located, urban section, and concurrently with such renewal, incorporate the control system of the present invention in the renewed area.

Another object is to provide a traffic intersection and flow control system in which a better and less obstructed view of traffic entering the intersection is provided than in conventional 90° intersections due to the arrangement of the traffic intersections of the present invention such that all roadways entering the intersection extend at an angle of at least 120° to each other.

Another object of the invention is to provide a traffic intersection and flow control system in which vehicle parking areas and business buildings may be compatibly accommodated to the traffic flow system of the invention to provide for easy access to parking areas and business buildings from the roadways included in the system.

An additional object of the invention is to provide a traffic intersection and flow control system which requires fewer traffic control signals or lights than in the case of a conventional rectangular, four-lane intersection traffic grid system.

Another object of the invention is to provide an improved signal light for use in the control of traffic flow, which signal light is operative to permit a vehicle operator approaching an intersection to correlate his braking of the vehicle with the speed of the vehicle and the time at which a stop signal will positively indicate that he should not enter the intersection.

In addition to the foregoing described objects and advantages, additional objects and advantages will become apparent as the following detailed description is read in conjunction with the accompanying drawings which illustrate embodiments of the invention.

In the drawings:

FIG. 5 is a schematic illustration of a novel traffic control signal apparatus which can be usefully employed in the traffic control system of the present invention, this view illustrating schematically the manner in which two moving sectors of light are developed by the traffic control signal apparatus.

FIG. 6 is a plan view of the novel traffic control signal apparatus.

FIG. 7 is a sectional view taken on line 7—7 of FIG. 6.

FIG. 8 is a sectional view taken on line 8—8 of FIG. 7.

FIG. 9 is a sectional view taken on line 9—9 of FIG. 7.

FIG. 10 is a perspective view of one of two identical annular, cam plates used in the traffic control signal apparatus depicted in FIGS. 7-9.

FIG. 11 is an electrical circuit diagram illustrating electrical circuitry employed in the traffic signal control apparatus.

Figure 1:
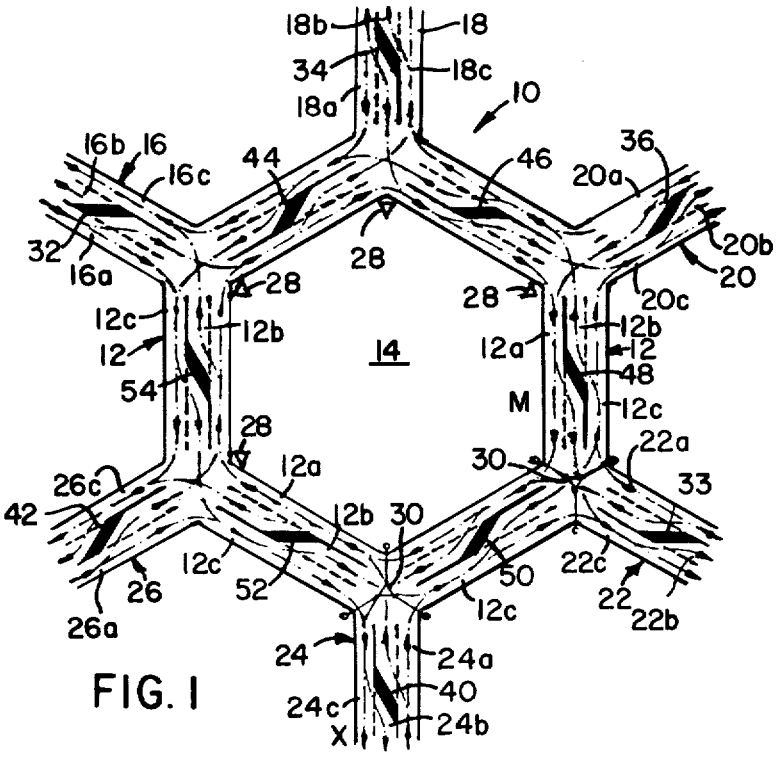
FIG. 1 is a plan view of a traffic intersection and flow control system constructed in accordance with one embodiment of the invention, and illustrating one of the hexagonal traffic interchange units making up the basic unit in the traffic flow control grid of the invention.

Referring now to the drawings in detail, and initially to FIG. 1, a traffic intersection and flow control system constructed in accordance with the invention is designated generally by reference numeral 10 and includes a generally hexagonal, multilane roadway 12 which encloses a large hexagonal open space 14. The hexagonal, multilane roadway 12 is intersected at its corners by a plurality of radiating, outwardly extending roadways 16, 18, 20, 22, 24 and 26. The size of the enclosed hexagonal space 14 may be varied over a wide range, but in most instances, will preferably be from about 150 to about 350 feet in width, and will be used for the accomodation of business or industrial buildings, or for the provision of a large automobile parking area, or for both buildings and parking.

In the arrangement depicted in FIG. 1, two types of mounting of traffic control signals have been depicted for purposes of illustration or example. Thus, a traffic light mounted atop a suitable upright member or pole is designated by reference numeral 28 while a signal light which is suspended over the center of an intersection on cables or other suitable members is designated by reference numeral 30. Both types of traffic signal support structures are well understood in the art and will not be discussed further herein except in the incidental relationship of such support structures to the specific type of three-way traffic signals or lights which are provided as hereinafter described.

The generally hexagonal, multilane roadway 12 which is utilized in the embodiment of the invention depicted in FIG. 1 is divided into three traffic lanes which have been indicated in the drawing by reference numerals 12a, 12b and 12c. The lane 12a is the innermost lane and adjoins, or is contiguous with, the large hexagonal space 14 enclosed by the hexagonal roadway. The lane 12b is the central lane, while the lane 12c is outermost in the hexagonal roadway. Each of the radiating outwardly extending roadways 16–26 is also characterized in being divided into three lanes with such lanes being designated by the letters a, b, and c as in the case of the three lanes of the hexagonal roadway 12. The flow of traffic in the lanes of the several roadways as it moves in accordance with the control provided by the present invention is indicated by arrows and broken lines.

Final elements of the traffic intersection and flow control system of the invention are traffic dividing islands. These islands are provided in each of the radiating, outwardly extending roadways 16–26, and also at points spaced around the hexagonal roadway 12 between the several corners thereof. Thus, a traffic dividing island 32 is provided in the radiating, outwardly extending roadway 16, an island 34 in the roadway 18, an island 36 in the radiating roadway 20, an island 38 in the radiating roadway 22, an island 40 in the roadway 24, and an island 42 in the roadway 26. The islands positioned in the hexagonal roadway between the six corners thereof are designated by reference numerals 44–54, and are also positioned diagonally with respect to the direction of traffic flow for a purpose hereinafter explained.

Figure 3:
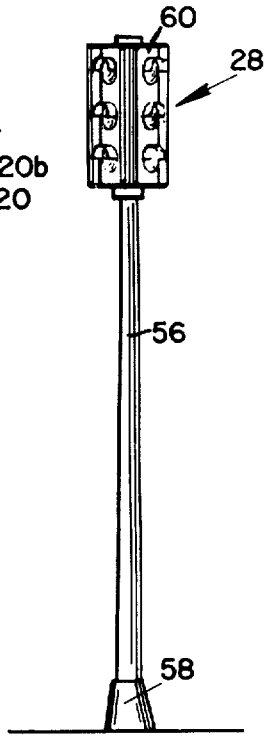
FIG. 3 is a view in elevation of one type of traffic control signal which can be used in the present invention.
Figure 4:
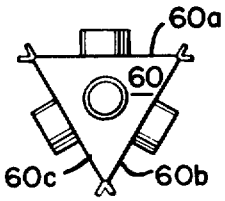
FIG. 4 is a plan view of the traffic control signal depicted in FIG. 3.

The traffic signals 28 and 30 which are utilized in the traffic intersection and flow control system of the invention are, in each case, preferably three-way lights of a novel construction hereinafter described in detail. These signals control the flow of traffic from three directions through each of the intersections of the hexagonal roadway 12 with the several radiating roadways 16–26. A typical general construction of such traffic signals is depicted in FIGS. 3 and 4 and includes a supporting pole 56 which is secured to the ground by a suitable base 58, and which supports at its upper end, a triangular housing 60 having three sides 60a, 60b, and 60c extending at an angle of 60° to each other so that the housing 60 has a cross-section conforming to the geometry of an equilateral triangle. Each of the sides 60a—60c of the housing 60 carries the conventional red, yellow and green lights to indicate to motorists whether their lane of traffic is to go, to exercise caution, or to stop.

Instead of being supported on the pole 56, the housing 60 can also, and perhaps to better advantage, be supported by suitable cables or other suspension members over the center of the intersection as indicated by reference numerals 30 in FIG. 1. In either event, the purpose of the triangular construction of the housing 60 and the positioning of the control lights in the manner described is to permit vehicular traffic entering the intersections at each corner of the hexagonal roadway to have an unobstructed view of the traffic signals, and to be apprised of the time at which traffic moving in a particular lane adjacent the intersection can proceed safely through the intersection without encountering traffic from other lanes.

OPERATION

For the purpose of explaining the operation of the traffic intersection and flow control system of the invention, let it initially be assumed that an automobile is moving in lane 16a of the radial roadway 16, and is approaching the intersection of this radial roadway with the hexagonal roadway 12. As the line of traffic moving in lane 16a approaches the intersection, some of the cars may diverge and move into the central lane 16b once the line of traffic has moved even with and slightly past the traffic island 32. Whether a given automobile moves into the central traffic lane 16b after passing the island 32 in approaching the intersection will depend on whether the automobile wishes to turn to the left or to the right in entering the hexagonal roadway 12.

Assuming that an automobile moving in the lane 16a desires to proceed to a point X which is located at the side of the radial, outwardly extending roadway 24, the automobile will, in this event, remain in the traffic lane 16a until the intersection of the radial roadway 16 with the hexagonal roadway 12 is reached. Then, depending upon the status of the traffic signal 28 at this intersection, the automobile will be stopped or will be driven into the intersection. In any event, when the automobile is free to enter the intersection, the driver will turn to the right through an angle of about 60° and enter the lane 12c. Stated differently, as viewed in FIG. 1, the automobile will enter lane 12c and will move in a counterclockwise direction around the hexagonal roadway 12. When the automobile has been driven to a point abreast of the traffic island 54, the operator will move to his left into the central lane 12b and will then continue in this lane until the intersection of the hexagonal roadway 12 with the radial roadway 26 is reached. Here, when the three-way traffic signal 28 has indicated that the operator of the vehicle can proceed through the intersection, the automobile is driven through the intersection and into lane 12c in that portion of the hexagonal roadway between the intersections of this roadway with the radial roadways 26 and 24. The driver continues in lane 12c until he reaches the intersection of the roadway 12 with the radial roadway 24. When the automobiles in the three lanes 12a, b, and c are permitted by the traffic signal 30 to move through the intersection of the radial roadway 24 with the hexagonal roadway 12, the operator of the automobile in question turns through the intersection and into the lane 24c in the roadway 24. Though they are not illustrated, the radial roadways 16–26, as well as the hexagonal roadway 12, are provided with feeder or access streets at spaced intervals therealong to permit traffic to enter and exit from the peripheral or side lanes along these roadways. Thus, when the operator of the automobile in question approaches the access road or exit which is nearest his point of destination X, the automobile is driven off of the roadway 24 from lane 24c and is parked in a suitable location near the destination.

Let it now be assumed that a person working in a building M located within the hexagonal space 14, and parking his automobile in or near such building desires to leave the building and proceed to his residence which may be assumed to lie at some distance out on the radial roadway 18. He will initially drive his automobile into the lane 12a of the hexagonal roadway 12 and will proceed to move clockwise around the hexagonal roadway in the inside lane 12a until he comes to the traffic island 44. In proceeding around the hexagonal roadway 12, the vehicle operator will, of course, proceed through the several intersections in accordance with signals indicated on the several traffic signals 30 and 28. When the vehicle operator comes abreast of the traffic island 44, he will drive the automobile into the central land 12b on that side of the island 44 which is most nearly adjacent the intersection of the hexagonal roadway 12 with the radial roadway 18. Then, after passing through the intersection upon the proper traffic signal, the operator of the vehicle will move first into the lane 18c, and will then either continue in this traffic lane or will move to the left into the lane 18b and proceed in one of these lanes toward his residence or ultimate destination.

The traffic signals 28 and 30 are operated so that, at any given time, traffic moves from any one of the three roadway branches entering an intersection into either of the other two branches, depending upon the destination and choice of the vehicle operators. At no time are vehicles entering any intersection simultaneously from two different directions. It will also be noted that there is no opportunity provided with the described system for traffic to converge or cross so that some automobiles are crossing in front of others.

The hexagonal interchange provided by the traffic control system of the invention permits large buildings to be erected in the hexagonal space 14 in the center of the hexagonal roadway 12, or for this space to be devoted to automobile parking, or for both uses to be made of the space. Pedestrians may move across the several roadways by any one of several routes, such as by tunnels provided underneath the roadways and linking the hexagonal space 14 with the spaces located on the outside of the hexagonal roadway 12. A preferred crossing arrangement, however, uses the traffic islands in conjunction with overhead walkways which permit pedestrians to cross over the inner and outer lanes of the three lane roadways to the islands at will. It should also be pointed out that the traffic signals 28 and 30 located at the several intersections can be arranged to provide a stop signal for vehicular traffic to permit pedestrians to walk through the intersection in any direction, if such an arrangement should be preferred. This arrangement, however, has the disadvantage of delaying vehicular traffic and increasing the time required for traffic to move across a given area of the city in which the system is utilized.

Figure 2:
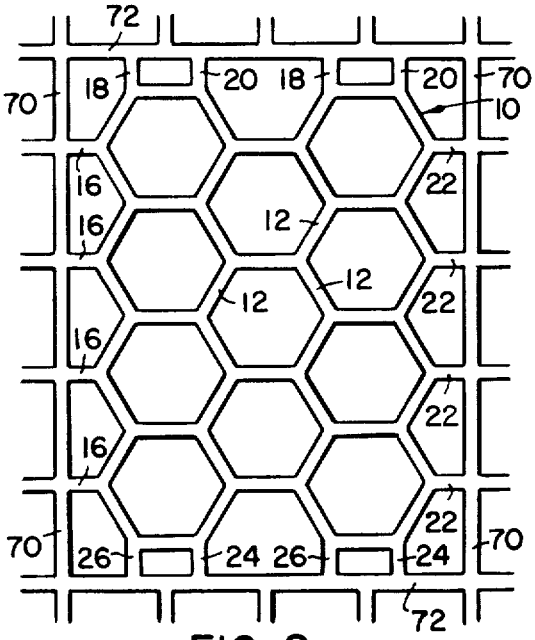
FIG. 2 is a schematic illustration of the manner in which the traffic intersection and flow control system of the invention can be incorporated in a conventional urban street arrangement in which the streets intersect at right angles.

An especially desirable feature of the traffic intersection and flow control system of the invention is the manner in which it lends itself to incorporation in an existing conventional rectangular street grid or network as it is most often presently used in urban areas. Such integration of the system of this invention with an existing rectangular street network is depicted in FIG. 2. Here the traffic intersection and flow control system 10 of the present invention is shown as it is incorporated in a large area in which, for example, urban renewal has been effected without disturbance or change in the outlying portions of the metropolitan area. Thus, in such outlying area, regular north-south east-west streets, designated by reference numerals 70 and 72, respectively, have been interconnected by the radial roadways of the system of the present invention, and a series of contiguous hexagonal roadways 12 are provided in the center of the renewed area.

A novel traffic control signal light which can be very usefully employed in the traffic intersection and flow control system of the invention is depicted in FIGS. 5–9. The manner in which the signal light functions can be best described by referring to the somewhat schematic portrayal of the light in FIG. 5. As shown here, the signal light 110 is provided with the usual red, amber and green lamps 112, 114 and 116, respectively, and is supported on a suitable light pole 118. A group of movable vanes or louvers 120 is provided for directing the light emanating from the red lamp 112, and these louvers each have a light reflecting upper surface and a light absorbing lower surface. Groups of movable louvers or vanes 122 and 124 are also provided for directing the light emanating from the amber and green lamps, respectively. The louvers 122 and 124 each have a light reflecting lower surface and a light absorbing upper surface. The louvers 120, 122 and 124 are so positioned relative to each other, and are so actuated by a hereinafter described pivoting mechanism, that during one period in the cycle of operation of the lamps, all three of the lamps are lit or burning, and their light is directed to produce a totally red sector 126 which is substantially contiguous to a sector 128 in which both the green and amber lights are visible to a motorist in this sector ([see] *See* FIG. 5). The louvers 120, 122 and 124 are pivoted in synchronism so that the red sector 126 is enlarged, the green-amber sector 128 is reduced in size, and the interface or boundary plane 130 between the sectors 126 and 128 is moved continuously toward the intersection at which the signal light is located.

The structure used to accomplish this distribution of light, and this movement of the illuminated sectors is most clearly illustrated in FIGS. 6–10. The signal light 110 includes a housing 132 which is of triangular cross section and has its three sides projected to form light shields designated 132a–132f in FIGS. 6 and 8. The housing 132 is slotted near its top and its bottom to accommodate an upper annular cam plate 134 and a lower annular cam plate 136 so that the outer peripheral portions of these cam plates 134 and 136 project outside the housing ([see] *See* FIG. 8). A motor 138 is mounted in the lower portion of the housing 132 and drives a shaft 140 which is keyed to the cam plates 134 and 136 for driving them in rotation. Each of the cam plates 134 and 136 has a slotted surface which includes an abrupt shoulder 142, a gradually tapered shoulder 144, and a lower flat 146 and an upper flat 148 all positioned contiguously in circular array as shown in FIGS. 7 and 10. The upper cam plate 134 is mounted with its slotted surface facing downwardly, and the lower cam plate 136 is mounted with its slotted surface facing upwardly.

Mounted within the housing 132 between the upper and lower cam plates 134 and 136 are nine electric lamps, these lamps being arranged in three sets of three vertically aligned lamps, with the red lamp 112 being the uppermost lamp in each set, the amber lamp 114 being the central lamp, and the green lamp 116 being the lowermost of the three lamps in each set. The lamps are oriented at angles of 60° with respect to each other so that they face outwardly through openings formed in the three side walls of the housing 132 as best depicted in FIGS. 7 and 9.

Positioned adjacent the lamp apertures in the walls of the housing 132 and secured in a vertically extending position on the respective walls of the housing 132 are a plurality of vane or louver rod brackets 150 ([see] *See*

FIG. 9). The brackets 150 journal one end of each of a plurality of vertically spaced louver rods 152 which are welded or otherwise suitably secured to the louvers 120, 122 and 124. Each of the louvers 120, 122 and 124 is formed as a substantially rectangular plate having light absorbing and light reflecting surfaces as hereinbefore explained. At their ends which are opposite their ends journaled in the louver rod brackets 150, the louver rods extend into U-shaped gear housings 160. The three gear housings 160 are secured to each of the three walls of the housing 132, and extend vertically on the opposite sides of the lamp apertures from the sides thereof on which the respective rod brackets 150 are located. A small toothed gear sector 162 is secured to the end of each of the louver rods 152 with the gear sectors being positioned in and protected by, the gear housing 160 (see FIG. 7). A rack or toothed rod 164 having two right angle bends therein to provide an offset extends downwardly through the top of each of the gear housings 160 and is positioned so that the teeth carried by the rack 164 engage the teeth on the toothed gear sectors 162 which are located in the respective gear housing. The upper end of each of the racks 164 is provided with a small roller or cam follower 166 which is positioned to roll upon the downwardly facing slotted surface of the upper cam plate 134, and to follow the contour thereof as this cam plate is rotated. A spring 168 is disposed between a suitable stop pin carried by each rack 164, and the top of the respective gear housing 160 so that the roller 166 at the top of the rack 164 is constantly resiliently biased into contact with the slotted surface of the upper cam 134.

In a manner similar to the arrangement of the toothed gear sectors 162 on the louver rods 152 which carry the louvers 120 associated with the red lamp 112, the louver rods 152 to which are secured the louvers 122 and 124 associated with the amber and green lights, respectively, also carry toothed gear sectors at their ends inside the gear housings 160, these gear sectors each being designated *by* reference numeral 170 in the case of those louver rods carrying the louvers 122, and 172 in the case of the louver rods carrying the louvers 124. A rack or toothed bar 174 extends upwardly through the bottom of each of the gear housings 160 and is positioned so that its teeth engage the several gear sectors 170 and 172. Each of the three racks 174 carries at its lower end a small cam follower or roller 176 which bears against the slotted surface of the lower cam plate 136 and follows the contour thereof during rotation of this cam plate. The roller 176 carried at the lower end of each of the racks 174 is continuously biased into contact with the slotted surface of the lower cam plate 136 by a spring 178 which is extended between an appropriate stop pin on the respective rack and the lower end of the respective gear housing 160.

The orientation and construction of the several vanes or louvers 120, 122 and 124 are of substantial importance to the proper functioning of the novel and improved signal light of the invention. Thus, it will be noted that the louvers 122 and 124 associated with the amber and green lamps 114 and 116, respectively, are inclined downwardly and extend substantially parallel to each other. The louvers 120 associated with the red lamp 112, however, extend upwardly in one of their positions, and these louvers are also oriented in parallelism with each other. The upper surface of each of the louvers 120 is coated or covered with a light reflecting material so that red light emanating from the red lamp 112 is not only directed outwardly through the space between these louvers, but is reflected upwardly so as to provide a relatively large and far extending sector of red light during operation of the signal light as hereinafter described.

In the case of the louvers 122 and 124 associated with the amber and green lamps 114 and 116, respectively, these louvers carry a light reflecting material on the lower surface of each of the louvers. Light from the amber and green lamps 114 and 116, respectively, is thus reflected downwardly at a relatively steep angle so that the sector 128 in which the amber and green light is visible to a motorist moving along the roadways extends to a point relatively close to the intersection or to the location of the traffic control light 110. The effect of this orientation and construction of the several louvers will become more clearly apparent as the operation of the signal light is hereinafter explained.

Electrical circuitry which is provided for use in controlling the timing sequence of the red, amber and green lamps 112, 114 and 116, respectively, is depicted in FIG. 11 of the drawings. An A.C. generator 180 or other suitable source of electrical power is connected to a circuit which includes the amber lamp 114, the green lamp 116 and a normally closed switch 182. Circuitry is also provided which includes a two-position switch 184 for alternately connecting either the red lamp 112 or the green lamp 116 across the source of power 180. The two switches 182 and 184 used to energize the lamps 112, 114 and 116 at different times during the operation of the traffic control light 110 may be located at several different locations so as to be alternately open and closed, or shifted from a first to a second position by contact with the switches of moving mechanical portions of the apparatus. This will be better understood as the sequencing of the mechanical movements and electrical switching of the apparatus is hereinafter explained.

Let it be assumed that a driver is approaching an intersection at which the novel traffic control signal light 110 is located. Let it further be assumed that the approach is being made at a time when the green lamp 116 in the bank or set of lamps facing the driver is lighted, and the louvers 120, 122 and 124 are positioned substantially as shown in FIG. 5, or as shown [in] *on* the left side of the sectional view of the housing 132 in FIG. 7. The status of the electrical circuitry at this time can be assumed to be that the switch 182 is open so that the amber lamp 114 is unlighted, and that the switch 184 is thrown to a position such that the red lamp 112 is unlighted and the green lamp 116 is lighted. At the same time that this status of the electrical circuit exists, the rollers 166 and 176 carried at the lower end of the racks 162 and 174, respectively, are riding on the flats 146 of the upper and lower cam plates 134 and 136, respectively. This relationship is best illustrated in FIG. 7. These positions of the rollers 166 and 176 and their associated racks 164 and 174 assure that the louvers 120, 122 and 124 are located in the positions depicted in FIG. 5 and on the left side of FIG. 7.

The energization of the green lamp 116 by operation of the switch 184 at this time can be conveniently effected by placing appropriate switch contacting protuberances on the inner peripheral surface of the annular cam plates 134 [ad] *and* 136, or by placing the switch at a preselected point along the racks 164 and 174, or in a position to be actuated by movement of the louvers 120, 122 and 124. It is only necessary that synchronism be effected between the operation of switch 184 to form an electrical circuit through the green lamp 116, and the movement of the louvers 120, 122 and 124 to the described [position] *positioned* by rotation of the cam plates 134 and 136.

As the cam plates 134 and 136 continue to rotate in a clockwise direction as viewed in FIG. 8 of the drawings, the rollers 166 and 176 continue to bear against the flat 146 of the slotted cam plate surface for a preselected period of time and, during this time, the green lamp 116 continues to burn. Continued rotation of the cam plates 134 and 136 ultimately brings the rollers 166 and 176 onto the gradually tapered shoulder 144 so that the rack 164 begins to move slowly downwardly, and the rack 174 commences to move slowly upwardly. The effect of these movements of the racks 164 and 174 is to cause a gradual pivotation of the louvers 120, 122 and 124 about their respective louver rods 152.

Simultaneously with the movement of the rollers 166 and 176 onto the respective gradually tapered shoulders 144 of the respective slotted cam plate surfaces, the switch 184 is thrown to its alternate position to light the red lamp 112, and the switch 182 is closed to provide simultaneous illumination of the amber lamp 114 and the green lamp 116. Thus, at the time that the rollers 166 and 176 commence to move on the gradually tapered shoulders 144 of the cam plates 134 and 136, all three of the lamps are lit. As the louvers 120, 122 and 124 are gradually pivoted downwardly about their louver rods 152, the effect of this movement is to gradually diminish the size of the sector 128 in which both the amber and green lights are visible to a motorist, to gradually enlarge the size of the sector 126 in which only the red light is visible to the motorist, and to simultaneously cause the interface or [plans] *plane* of division 130 between these sectors to move inwardly toward the intersection.

The rate of pivotation of the louvers 120, 122 and 124 is preferably adjusted so that the interface or plane of division 130 between the sectors 126 and 128 sweeps along the roadway toward the intersection at a rate which is equivalent to the legal speed limit on the roadway approaching the intersection. Thus, at this time, the motorist approaching the intersection may find himself either in that sector 126 in which only the red lamp 112 is visible, or he may be located in the sector 128 where both the amber and the green lamps are visible. As the size of the sectors 126 and 128 change, and the interface 130 between them sweeps inwardly toward the intersection where the traffic signal light 110 is located, a motorist who is driving too slowly may find himself overtaken by the red sector and will be clearly advised well in advance of reaching the intersection that he should commence to apply the brakes. On the other hand, a motorist who is initially in the red sector will know that he must stop at the intersection unless he violates the law by speeding up to a speed exceeding the legal limit in order to overtake the green-amber sector 128. A significant aid is thus provided by the described arrangement to witnesses and to motorists alike in evaluating the fault of motorists involved in any accidents which may occur at or adjacent the intersection since it will be possible to testify whether the motorist overtook the moving boundary 130 between the amber-green sector 128 and the red danger sector 126.

After the rollers 166 and 176 complete their travel up the gradually tapered shoulder 144 of the upper and lower cam plates 134 and 136, respectively, the louvers will be in the lowered position shown at the right of FIG. 7. Thus, the louvers 122 and 124 associated with the amber and green lights 114 and 116, respectively, will be slanted downwardly at a steep angle, and the effect will be that essentially no light emanating from either of these lamps will be visible to motorists approaching the intersection. On the other hand, the louvers 120 associated with the red lamp 112 are not inclined downwardly at such steep angle, and the position of these louvers, coupled with their characteristic of having light reflecting upper surfaces, is such that a red sector will extend from far down the roadway approaching the intersection to a point at the base of the pole 118 or at least to within the intersection at which the traffic signal 110 is located. This broad coverage of the red sector at this time is accomplished by the transmission of direct rays through the slots or openings existing between the [louver] *louvers* 120, and also by the reflection of red light from the reflective upper surfaces of each of the louvers 120.

At the time that the rollers 166 and 176 move onto the flat 148 of the upper and lower cam plates 134 and 136, respectively, to move the louvers 120, 122 and 124 to the position shown at the right of FIG. 7, though the amber and green lamps 114 and 116 are obscured by their substantially closed louvers 122 and 124, these lamps may further be extinguished by opening the electrical circuits to them. This may be accomplished by opening the switch 182 at this time by contact with one of the louvers 122 and 124 when it has moved to the downwardly extending position illustrated, or by contact with a suitable protuberance carried upon one of the cam plates 134 or 136, or in any other suitable manner.

It will be noted in referring to FIGS. 7 and 8 that the slotted surface of each of the cam plates 134 and 136 permits three louver actuating sequences to be effected in the case of each of the three vertically aligned sets of red, green and amber lamps 112, 114 and 116, respectively, during each rotation of each cam plate. Thus, the two cam plates 134 and 136 may be used to operate each of the three vertically arranged sets of lamps in proper sequence at each intersection, and while the green lamp 116 alone is burning and the rollers 166 and 176 are moving on the flat 146 in the case of a single set of louvers and lamps facing in one direction, the red lamps 112 in the other two sets are illuminated, and the rollers 166 and 176 carried by the racks 164 and 174 associated with each of the other two sets of louvers are moving on the flats 148 of the two cam plates.

From the foregoing description of the invention, it will be apparent that the invention provides an improved traffic intersection and flow control system for rapidly moving traffic from one location to another in a densely populated metropolitan area with minimum danger of collision and obstruction. Moreover, the system can be easily adapted for inclusion in existing rectangular traffic patterns, and is well adapted to the inclusion within the roadway network provided by the system of business and commercial buildings, as well as large areas for vehicular parking, parks or the like.

Although preferred embodiments of the invention have been herein described in order to provide an example of the manner in which the invention should be practiced, it will be understood that various modifications and changes can be made in the invention without departure from the general principles which underlie the invention. *All such changes and modifications are*

*therefore deemed to be circumscribed by the spirit and scope of the invention except as the same may be necessarily limited by the appended claims or reasonable equivalents thereof.*

What is claimed is:

1. A traffic intersection and flow control system comprising:

a generally hexagonal, multilane roadway having radiating, multilane roadways extending outwardly from each corner of the hexagonal multilane roadway, the lanes of each of said multilane roadways being located in a single level;

traffic dividing island means in said hexagonal multilane roadway between each corner thereof and in each of said radiating multilane roadways for allowing traffic moving in a single lane to diverge and move in a plurality of lanes, said islands and lanes being positioned so that all traffic in that innermost lane of the hexagonal roadway which is nearest the enclosed hexagonal space moves at all times in one direction, and all traffic in the outermost lane of the hexagonal roadway moves at all times in the opposite direction to the direction of movement of traffic in said innermost lane, and being further positioned so that traffic moving in any of said lanes need at no time cross in front of traffic moving in the other lane; and traffic control signals adjacent each corner of said hexagonal multilane roadway for controlling the flow of traffic in three directions through the intersection of said hexagonal multilane roadway with the several radiating multilane roadways.

2. A traffic intersection and flow control system as defined in claim 1 wherein each of said roadways has an odd number of lanes therein.

3. A traffic intersection and flow control system as claimed in claim 1 wherein each of said roadways has three lanes, and said traffic dividing island means includes:

a traffic island in the center lane of each of said radiating, outwardly extending roadways; and traffic islands located in the center lane of said hexagonal, multilane roadway on the opposite side of each intersection of said hexagonal roadway with said radiating, outwardly extending roadways.

4. A traffic intersection and flow control system as defined in claim 3 wherein said traffic islands each extend diagonally across the respective center lanes in which they are located, and extend parallel to the direction in which automobiles will necessarily move when moving from an adjacent outside lane into said center lanes when the traffic in said outside lanes moves in opposite directions.

5. A traffic intersection and flow control system as defined in claim 1 wherein each of said traffic control signals comprises a triangular housing having three sides extending at 60° to each other, and having traffic signal lights in each of said sides.

6. A traffic intersection and flow control system as defined in claim 1 wherein said radiating, outwardly extending roadways each form a portion of other hexagonally shaped roadways contiguous with said first mentioned hexagonal roadway and having a side in common with said first mentioned hexagonal roadway in honeycomb fashion.

7. A traffic intersection and flow control system as defined in claim 5 and wherein each of said control signals is further characterized in having three sets of vertically aligned signal lamps in said housing with the lamps in each of said sets facing at an angle of 120° with respect to the direction in which the lamps in adjacent sets face to direct light through the three respective sides of said housing, each set of lamps containing a top lamp, a central lamp and a bottom lamp, the top lamp, central lamp and bottom lamp in each set producing lights of different colors from each other;

and wherein said control signal further includes louvers pivotally mounted on said housing in alignment with each of said lamps for directing light emanating from said lamps, said louvers being oriented relative to each other so that a first sector of light projected from said top lamp is clearly delineated from an adjacent second sector of light projected from both said central and bottom lamps; and means for synchronously pivoting said louvers to enlarge said first sector, diminish said second sector, and maintain each of said first and second sectors well defined with respect to each other while moving the boundary therebetween toward said traffic control signal.

8. A traffic control signal light comprising:

a housing having a plurality of apertures therethrough;

a first lamp for producing light of a first color positioned in said housing for directing said first color light through at least one of said apertures;

a second lamp for producing light of a second color positioned in said housing below said first lamp for directing said second color light through at least one of said apertures other than those through which said first color light is directed;

a first set of louvers pivotally mounted on said housing and aligned with said first lamp for directing light from said first lamp in a first sector extending from said signal light;

a second set of louvers pivotally mounted in said housing and aligned with said second lamp for directing light from [said] said second lamp in a second sector adjacent, but distinct from, said first sector with both of said first and second sectors intersecting[,] a plane extending normal to a vertical line extending through said housing;

means for [synchonously] *synchronously* moving said louvers in pivotal movement to simultaneously enlarge said first sector and diminish said second sector while concurrently moving the boundary between the two sectors.

9. A traffic control signal light as defined in claim 8 and further characterized to include:

a third lamp producing light of a third color positioned between said first and second lamps and aligned with at least one aperture in said housing other than the apertures through which said first color light is directed;

a third set of louvers pivotally mounted in said housing and aligned with said third lamp for directing said light of a third color into said second sector with said second color light; and means for synchronously moving said second and third set of louvers to maintain both said second and third color light in said second sector.

10. A traffic control signal light as defined in claim 8 wherein said first set of louvers includes a plurality of first plates extending in spaced parallel planes with each of said first plates being mounted for pivotation about a horizontal axis, each of said first plates having a light reflecting upper surface;

and wherein said second set of louvers includes a plurality of second plates extending in spaced, parallel planes with each of said second plates being mounted for pivotation about a horizontal axis which extends parallel to the horizontal pivotal axes of said first plates, each of said second plates having a light reflecting lower surface.

11. A traffic control signal light as defined in claim 10 wherein said means for synchronously moving said louvers comprises:

rods extending along the pivotal axes of each of said plates and secured to said plates;

gear means secured to each of said rods;

rack means drivingly engaging said gear means for driving said rods in rotation about their longitudinal axes; and cam means engaging said rack means and moving said rack means to effect synchronous movement of said plates in a predetermined pattern of movement.

12. A traffic control signal light comprising:

a first lamp for producing light of a first color;

a second lamp spaced from said first lamp for producing light of a second color;

louver support means adjacent said first and second lamps;

a first set of louvers pivotally mounted on said louver support means and aligned with said first lamp for directing light from said first lamp in a first sector extending from said signal light;

a second set of louvers pivotally mounted on said louver support means and aligned with said second lamp for directing light from said second lamp in a second sector adjacent, but distinct from, said first sector; and means for synchronously moving said louvers in pivoted movement to simultaneously enlarge said first sector and diminish said second sector while concurrently moving the boundary between the two sectors.

13. A traffic intersection and flow control system comprising:

a generally [polygonal] *hexagonal*, multilane roadway having radiating, multilane roadways extending outwardly from each corner of the [polygonal] *hexagonal* multilane roadway, the lanes of each of said multilane roadways being located in a single level;

traffic dividing island means in said [polygonal] *hexagonal*, multilane roadway between each corner thereof and in each of said radiating multilane roadways for allowing traffic moving in a single lane to diverge and move in a plurality of lanes, said traffic dividing island means and lanes being positioned so that traffic moving in any of said lanes need at no time cross in front of traffic moving in any other lane; and traffic control signals adjacent each corner of said [polygonal] *hexagonal*, multilane roadway for controlling the flow of traffic in three directions through the intersection of said [polygonal,] *hexagonal* multilane roadway with the several radiating multilane [roadyays] *roadways*.

*14. A method for controlling traffic approaching a traffic intersection from a traffic control signal source positioned proximate to the traffic intersection comprising the steps of:*

*displaying at the traffic control signal source a "go" signal indication visible to traffic in a first sector, the traffic in the first sector being at a sufficiently short distance from the traffic intersection that passage thereof through the traffic intersection at a predetermined traffic control speed is permitted; and*

*simultaneously displaying at the traffic control signal source a "stop" signal indication visible to traffic following said first sector in a second sector, the second sector being at a greater distance from the traffic intersection than the first sector in the line of travel of traffic toward said intersection.*

*15. The method for controlling traffic approaching a traffic intersection as defined in claim 14 characterized further to include the additional step of:*

*simultaneously displaying at the traffic control signal source a "caution" signal indication visible to traffic in the first sector.*

*16. The method for controlling traffic approaching a traffic intersection as defined in claim 14 characterized in including the further steps of*

*moving the first sector in which the "go" signal indication is visible in a direction approaching the traffic intersection at a speed directly related to the predetermined traffic control speed; and*

*moving the second sector in which the "stop" signal indication is visible in a direction approaching the traffic intersection at a speed directly related to the predetermined traffic control speed.*

*17. The method of controlling stop-and-go traffic in a control zone from a traffic signal adjacent said zone comprising displaying at said traffic signal a "go" indication to traffic at sufficiently short distances from said traffic signal to permit safe transit through said zone at normal zone speed, while simultaneously displaying at said traffic signal, a "stop" indication to traffic at greater distances.*

*18. Apparatus for controlling traffic approaching a traffic intersection comprising:*

*a first source of light of one color;*

*a second source of light of a second and different color;*

*means for directing light of said one color into a first sector along a roadway passing under said first and second light sources; and*

*means for directing light of said second and different color into a second sector contiguous to said first sector and at a different distance along said roadway from said first and second sources than said first sector; and*

*means for simultaneously and continuously shifting the location of both said first and said second sectors toward said first and second sources of lights while maintaining said sectors contiguous to each other.*

*19. Method of controlling stop-and-go traffic in a control zone from a traffic signal adjacent said zone and having a view lens, comprising displaying at said lens a "go" indication to traffic at sufficiently short distances from said signal to permit safe transit through said zone at normal zone speed, while simultaneously displaying at said lens, a "stop" indication to traffic at greater distances.*

* * * * *